United States Patent Office 3,600,280
Patented Aug. 17, 1971

3,600,280
PROCESS FOR PREPARING ACETALS AND KETALS OF 2β,16α,17α-TRIHYDROXY STEROIDS
Patrick A. Diassi, 77 Sandy Hill Road, Westfield, N.J. 07090, and Pacifico A. Principe, 11 Monush St., South River, N.J. 08882
No Drawing. Original application Mar. 21, 1968, Ser. No. 714,784. Divided and this application June 6, 1969, Ser. No. 831,217
Int. Cl. C07c 167/08
U.S. Cl. 195—51R     1 Claim

ABSTRACT OF THE DISCLOSURE

This invention relates to the production of acetals and ketals of 2β,16α-dihydroxyhydrocortisone and acyl derivatives thereof. These compounds are prepared by subjecting acetals and ketals of 16α-hydroxycortexolone to the action of enzymes of *Absidia coerulea*. The final products of this invention are therapeutically useful compounds possessing anti-inflammatory and progestational activity. In addition, the products of this invention are useful as anti-oxidants and anti-corrosive agents. They are also surfactants and thus may be employed as emulsifiers and wetting agents.

RELATED APPLICATION

The present application is a division of copending U.S. patent application Ser. No. 714,784 filed Mar. 21, 1968 and now abandoned.

This invention relates to the production of acetals and ketals of 2β,16α,17α-trihydroxy steroids, in particular, the acetals and ketals of 2β,16α-dihydroxyhydrocortisone having the general formula

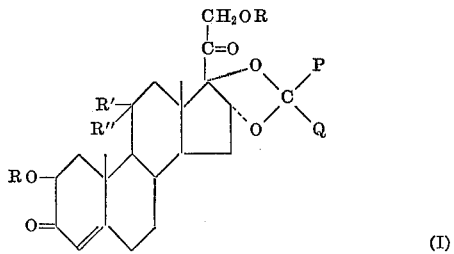

(I)

wherein R is selected from the group consisting of hydrogen and acyl; R' is hydrogen; R" is hydroxy; R' and R" together is keto; P is hydrogen, lower alkyl, halo lower alkyl, monocyclic cycloalkyl, monocyclic cycloalkyl lower alkyl, monocyclic aryl, monocyclic aryl lower akyl, monocyclic heterocyclic or monocyclic heterocyclic lower alkyl; Q is lower alkyl, halo lower alkyl, monocyclic cycloalkyl, monocyclic cycloalkyl lower alkyl, monocyclic aryl, monocyclic aryl lower alkyl, monocyclic heterocyclic or monocyclic heterocyclic lower alkyl; and, together with the carbon to which they are joined, P and Q is a monocyclic cycloalkyl or monocyclic heterocyclic radical.

The preferred acyl radicals employed are those of hydrocarbon carboxylic acids of less than twelve carbon atoms, and may be exemplified by the lower alkanoic acids (e.g., formic, acetic, propionic, butyric, valeric, trimethyl acetic and caproic acids), the lower alkenoic acids (e.g., acrylic, methacrylic, crotonic, 3-butenoic and senecioic acids), the monocyclic arylcarboxylic acids (e.g., benzoic and toluic acids), the monocyclic aryl-lower alkanoic acids [e.g., phenacetic, β - phenylpropionic, α-phenylbutyric, and 5-(p-methylphenyl) pentanoic acids], the cycloalkyl carboxylic acids (e.g., cyclobutane carboxylic acid, cyclopentane carboxylic acid and cyclohexane carboxylic acid), the cycloalkenyl carboxylic acids (e.g., 2-cyclobutene carboxylic acid and 3-cyclopentene carboxylic acids), the cycloalkyl and cycloalkenyl-lower alkanoic acids [e.g., cyclohexaneacetic, α-cyclopentanebutyric, 2 - cyclopenteneacetic and 3 - (3 - cyclohexane) pentenoic acid], and the like.

The term "lower alkyl" as employed herein, includes both straight and branched chain radicals of less than eight carbon atoms, for instance, methyl, ethyl, propyl, butyl, pentyl, hexyl, heptyl, octyl, isopropyl, t-butyl, isobutyl, isohexyl, 4,4-dimethylpentyl 2,2,4-trimethylpentyl, and the like.

The term "monocyclic aryl" as employed herein contemplates monocyclic carbocyclic aryl radicals, for instance, phenyl and substituted phenyl radicals, such as lower alkyl phenyl (e.g., o-, m- or p-tolyl, ethylphenyl, butylphenyl, and the like, di(lower alkyl)phenyl (e.g., 2,4-dimethylphenyl, 3,5-diethylphenyl, and the like), halophenyl (e.g., chlorophenyl, bromophenyl, iodophenyl, fluorophenyl), o-, m- or p - nitrophenyl, dinitrophenyl (e.g., 3,5-dinitrophenyl, 2,6-dinitrophenyl, and the like), trinitrophenyl (e.g., picryl).

The terms "monocyclic cycloalkyl" and "monocyclic cycloalkenyl" include cyclic radicals containing from 3 to 6 ring members (e.g., cyclopropyl, cyclobutyl, cyclopentyl, cyclohexyl, cyclobutenyl and cyclohexenyl).

The final products of this invention as set forth above are prepared by subjecting a compound of the following general formula

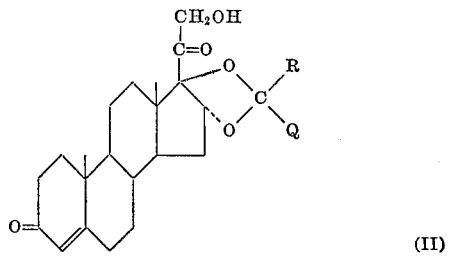

(II)

wherein P and Q are as set forth above, to the action of enzymes of the microorganism *Absidia coerulea*. This results in the selective introduction of 2β- and 11β-hydroxy groups into the molecule to yield the corresponding product as illustrated by Formula I.

The 2β-hydroxyl group can then be acylated by reaction with an appropriate acylating reagent such as acetic anhydride, propionic anhydride, acetyl chloride, etc., in an organic base such as pyridine, and the like.

The 11β-hydroxy of the compound thus formed may be then converted to 11-keto derivatives by oxidation with an appropriate oxidizing agent such as chromic acid, to form further products of this invention.

The enzymatic hydroxylation can best be effected either by including the steroid substrate in an aerobic culture of the microorganism, or by bringing together, in an aqueous medium, the steroid, air and the microorganism. In general, the conditions for culturing the microorganisms for the purposes of this invention are (except for the inclusion of the steroid to be converted) the same as those for culturing various other molds for the production of antibiotics and/or riboflavin.

The microorganism is aerobically grown in contact with (in or on) a suitable fermentation medium. A suitable medium essentially comprises a nitrogenous substance and a source of carbon and energy. The latter may be a carbohydrate (such as sucrose, molasses, glucose, maltose, starch or dextrin) a fatty acid, a fat and/or the steroid itself. Preferably, however, the medium includes an assimilable source of carbon and energy in addition to the steroid. The source of nitrogenous factors may be natural (e.g., soybean meal, corn steep liquor, meat extract and/ or distiller solubles) or synthetic (i.e., composed of simple, synthesizable organic or inorganic compounds such as ammonium salts, alkali nitrates, amino acids or urea). An adequate sterile air supply should be maintained during fermentation, for example, by the conventional methods of exposing a large surface of the medium to air or by utilizing submerged aerated culture. The steroid may be added to the culture during the incubation period, or included in the medium prior to sterilization or inoculation. The preferred (but not limiting) range of concentration of the steroid in the culture is about 0.01 to 0.10% by weight. The culture period may vary considerably, e.g., within the range of about 6 to 96 hours. The steroid is then recovered from the fermentation medium in the usual manner, as more fully detailed in the examples following.

The hydroxyl groups may then be acylated in the usual manner, as by treating the steroid with an acid anhydride or acyl chloride of one of the hydrocarbon carboxylic acids of less than twelve carbon atoms mentioned hereinbefore. The reaction is preferably carried out in the presence of an organic base, such as pyridine.

The final products of this invention are physiologically active substances which possess progestational activity both orally and parenterally. As such, they may be employed in the veterinary field for treating conditions in both large and small animals (e.g., dogs, cats, sheep, cows, horses, and the like) which require a progestational agent. For instance, in animal breeding, the compounds of this invention are useful in preventing threatened abortion and may be administered for this purpose in dosages of about 2 to about 100 mg./kg. of body weight daily. In addition, control of milk and egg production may be achieved by regulation of the cycles of cows and chickens through the administration of the compounds of this invention in daily dosages, also of about 2 to about 100 mg./kg. of body weight.

They may also be employed in lieu of cortisone as antiinflammatry agents in the treatment of acute inflammatory and allergic diseases of the eye, skin and mucosa and diseases such as rheumatoid arthritis and rheumatic fever. For these purposes, oral dosages may vary from about 0.05 to 1.5 mg./kg. daily, intramuscular dosages from about 0.1 to 4.5 mg./kg. daily, intravenous dosages up to about 1.5 mg./kg. daily (by drip) and topically they may be administered as a 0.5 to 2.5% suspension, ointment, cream, or the like.

Perorally acceptable formulations can be prepared in the usual manner to provide an aqueous suspension, an elixir or a solid dosage unit form (e.g., tablet, powder or capsule), for example, two-piece hard gelatin capsules may be filled with a mixture of the active ingredient and excipients (e.g., starch, talc, stearic acid, and/or magnesium stearate). Also, one-piece gelatin capsules containing the same amount of medicament may be prepared using sufficient corn oil or other suitable vegetable oil, to render the compound capsulatable. Tablets may be prepared by using starch, lactose of other conventional excipients, and may be scored to enable the administration of fractional dosages, if desired. Any of the tableting material used in pharmaceutical practice may be employed. Liquid preparations may be in the form of suspensions, emulsions, syrups or elixirs of the active substance in water or other liquid medium commonly used for making orally acceptable pharmaceutical formulations, such as liquid paraffin or a syrup elixir base.

The active substance may also be made up in a form suitable for parenteral administration, i.e., as a suspension in sterile water or an organic liquid usually employed for injectable preparations, for example, a vegetable oil such as olive oil or a sterile solution in an organic solvent.

The final products of this invention may be formulated into a preparation suitable for topical administration in conventional manner with the aid of one or more carriers or excipients. Examples of types of topical formulation include ointments, creams, sprays, aerosols, and the like.

Ointments and creams may, for example, be formulated with an aqueous or oily base with the addition of suitable thickening and/or gelling agents. Such bases may, for example, include water and/or an oil such as liquid paraffin or a vegetable oil such as castor oil, arachis oil or the like. Various thickening agents may be employed in accordance with the nature of the base, for example, soft paraffin, aluminum stearate, cetostearyl alcohols, polyethylene glycols, woolfat, hydrogenated lanolin, and the like. Lotions may likewise be formulated with an aqueous or oily base and will in general also include various emulsifying agents, dispersing agents, suspending agents, thickening agents, coloring agents, perfumes, and the like.

In addition, the compounds of this invention (both intermediates and final products) are surface active agents which may therefore be employed in a variety of applications requiring such an agent. For example, the compounds of this invention may be employed as emulsifying agents in the preparation of lubricants, adhesives, polishes, wax compositions, and the like. Further, these compounds are ultraviolet-absorbing materials and may be employed as sun-screening agents. They may also be employed as antioxidants and corrosion inhibitors for various hydrocarbons and mixtures thereof. As an example of materials to which the compounds of this invention may be added for this purpose, may be mentioned gasoline, hydrocarbon lubrication oils and greases, hydrocarbon solvents (e.g., toluene, kerosene), and the like.

The following examples illustrate the invention, all temperatures being in degrees centigrade:

EXAMPLE 1

2$\beta$,16$\alpha$-dihydroxyhydrocortisone 16,17-acetonide (A) Fermentation.—Surface growth from each of 2- two-week-old agar slants of *Absidia coerulea* (CBS) (Centraalbureau voor Schimmel Cultures, Baarn, Netherlands), the slants containing as a nutrient medium (A):

| | Grams |
|---|---|
| Glucose | 10 |
| Yeast extract | 2.5 |
| $K_2HPO_4$ | 1 |
| Agar | 20 |
| Distilled water to 1 liter. | | is suspended in 5 ml. of 0.01% aqueous sodium lauryl sulfate solution. One ml. portions of this suspension are used to inoculate eight 250 ml. Erlenmeyer flasks each containing 50 ml. of the following sterilized medium (B):

| | Grams |
|---|---|
| Cornsteep liquor | 6 |
| $NH_4H_2PO_4$ | 3 |
| Yeast extract | 2.5 |
| Dextrose | 10 |
| $CaCO_3$ | 2.5 |
| Distilled water to 1 liter. | |

After 24 hours incubation at 25° C. with continuous rotary agitation (280 cycles/minutes; two-inch stroke), 10% (vol./vol.), transfers are made to twenty 250 ml. Erlenmeyer flasks each containing 50 ml. of freshly sterilized medium (B). Steroid (300 micrograms/ml.) is then added by supplementing each flask with 0.25 ml. of a sterile solution (60 mg./ml.) of 16$\alpha$-hydroxycortexolone 16,17-acetonide in N,N-dimethylformamide. A total of 300 mg. is fermented.

After approximately 26 hours of further incubation, using identical conditions as described above, the contents of the flasks are pooled and the broth is then filtered through a Seitz clarifying pad. The flasks, mycelium and pad are washed with successive 100 ml. portions of warm water. The combined filtrate and washings have a volume of 1200 ml. They are extracted three times with 400 ml. portions of chloroform which are combined, washed with water and evaporated under reduced pressure. Crystallization of the residue from acetone-hexane gives 16$\alpha$-hydroxyhydrocortisone 16,17-acetonide having a melting point of about 205–206° C.

The mother liquor from several fermentations are collected and plate chromatographed on silica gel $HF_{254}$ using ethyl acetate-chloroform (1:1, v.:v.) as the developing solvent. Several bands are detectable by ultraviolet light. The least polar band is separated, eluted with 20% methanol in ethyl acetate and after evaporation of the solvent there is obtained 16α-hydroxycortisone 16,17-acetonide having $\tau_{CDCl_3}^{SiMe_4}$ 9.41 (s., 18–$CH_3$), 8.59 (s., 19–$CH_3$), 8.81 (s., β–$CH_3$ of acetonide), 8.48 (s., α–$CH_3$ of acetonide), 4.94 (d., J.=4.5 c.p.s., 16β–H), 4.28 (s., 4–H). From the most polar band, by a similar procedure of elution, filtration and evaporation, there is obtained 2β,16α-dihydroxyhydrocortisone 16,17-acetonide.

EXAMPLE 2

2β,16α-dihydroxyhydrocortisone 16,17-acetonide 2,21-diacetate

A solution of 100 mg. of 2β,16α-dihydroxyhydrocortisone 16,17-acetonide in 3 ml. of dry pyridine and 1 ml. of acetic anhydride is kept at room temperature for 16 hours, then diluted with ice water and extracted with chloroform. The chloroform is washed successively with 2 N hydrochloric acid, 5% sodium bicarbonate and water and evaporated under reduced pressure. The residue is plate chromatographed on silica gel $HF_{254}$ using ethyl acetate-chloroform (1:4, v.:v.) as the developing solvent. Elution of the band at $R_f \approx 0.4$ detectable by U.V. with 20% methanol in ethyl acetate and evaporation of the solevnt gives a residue which on crystallization from acetone-hexane gives 2β,16α-dihydroxyhydrocortisone 16, 17-acetonide 2,21-diacetate having a melting point about 226–228° C., $[\alpha]_D^{25}+9.4°$ (chloroform).

$\lambda_{max.}^{alc.}$ 243 mμ (ε, 14,040), $\lambda_{max.}^{Nujol}$ 2.94, 5.72, 5.78, 5.98, 6.14μ.

$\tau_{CDCl_3}^{SiMe_4}$ 9.09 (s., 18–$CH_3$), 8.77 (s., β–$CH_3$ of acetonide), 8.61, 8.51 (s., s., 19–$CH_3$ and α–$CH_3$ of acetonide), 7.82 (s., 21–OAc and 21–OAc) 5.0, 5.10 (ABq, 21–$CH_2$), 5.41 (m., 11α–H), 463 (q., J.=5, 13.5 c.p.s. 2α–H), 4.27 (s., 4–H).

Analysis.—Calcd. for $C_{28}H_{38}O_9$ (518.58) (percent): C, 64.85; H, 7.39. Found (percent): C, 64.54; H, 7.50.

EXAMPLE 3

2β,16α-dihydroxycortisone 16,17-acetonide 2,21-diacetate

To a solution of 300 mg. of 2β,16α-dihydroxyhydrocortisone 16,17-acetonide in 20 ml. of reagent grade acetone is added dropwise a solution containing 20 mg. of chromic anhydride and 32 mg. of sulfuric acid per milliliter of acetone-water (9:1, v.:v.) until the solution is no longer decolorized. The excess oxidizing agent is decomposed with a few drops of methanol. The mixture is then slowly diluted with water whereupon crystals separate. These are filtered, washed with water and dried to give 274 mg. of 2β,16α-dihydroxycortisone 16,17-acetonide 2,21-diacetate having a melting point about 190–192° C., $[\alpha]_D^{25}+57°$ (chloroform), $\lambda_{max.}^{alc.}$ 238 mμ (ε, 14,300), $\lambda_{max.}^{Nujol}$ 5.71, 5.78, 5.88, 5.92, 6.16μ, $\tau_{CDCl_3}^{SiMe_4}$ 9.35 (s., 18–$CH_3$), 8.73 (s., β–$CH_3$ of acetonide), 8.60, 8.42 (s., s., 19–$CH_3$ and α–$CH_3$ of acetonide), 7.82 (s., 2–OAc. 21–OAc), 4.94, 5.35 (ABq, J.=17,7 c.p.s. 21–$CH_2$—), 4.95 (m., 16β–H), 4.72 (q., J.=5,10 c.p.s. 2α–H), 4.19 (s., 4–H).

Analysis.—Calcd. for $C_{28}H_{36}O_9$ (516.57) (percent): C, 65.09; H, 7.02. Found (percent): C, 65.50; H, 7.28.

The invention may be variously otherwise embodied within the scope of the appended claims.

What is claimed is:

1. A process for preparing compounds of the formula

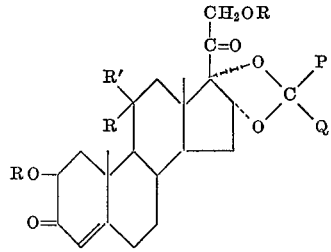

wherein R is selected from the group consisting of hydrogen and acyl group derived from hydrocarbon carboxylic acid of less than 12 carbon atoms; R' is hydrogen; R" is hydroxy; R, and R" together is keto; P is selected from the group consisting of hydrogen, lower alkyl, halo lower alkyl, monocyclic cycloalkyl, monocyclic cycloalkyl lower alkyl, monocyclic aryl, monocyclic aryl lower alkyl, monocyclic heterocyclic or monocyclic heterocyclic lower alkyl; Q is selected from the group consisting of lower alkyl, halo lower alkyl, monocyclic cycloalkyl, monocyclic cycloalkyl lower alkyl, monocyclic aryl, monocyclic aryl lower alkyl, monocyclic heterocyclic or monocyclic heteroyclic lower alkyl; and P and Q together are selected from the group consisting of monocyclic cycloalkyl and monocyclic heterocyclic radical which comprises subjecting a compound of the formula

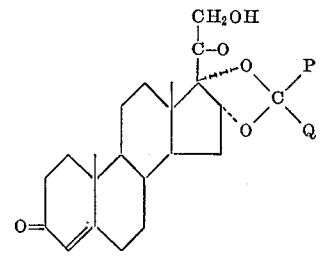

wherein P and Q are as set forth above to the action of the enzymes of *Absidia coerulea* and recovering the resulting product.

References Cited

UNITED STATES PATENTS 2,968,595  1/1961  Greenspan et al. _____ 195—51R

ALVIN E. TANENHOLTZ, Primary Examiner

U.S. Cl. X.R.

260—239.55D

UNITED STATES PATENT OFFICE
CERTIFICATE OF CORRECTION

Patent No. 3,600,280   Dated August 17, 1971

Inventor(s) Patrick A. Diassi and Pacifico A. Principe

It is certified that error appears in the above-identified patent and that said Letters Patent are hereby corrected as shown below:

Column 2, line 4, "3-(3-cyclohexane)" should read --3-(3-cyclohexene)-; formula

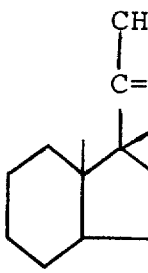   should read   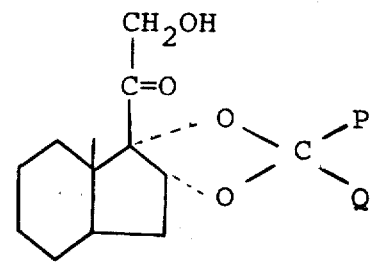

Column 3, line 38, "inflammatry" should read--inflammatory--.
Column 5, line 49, "463" should read--4.63--. Column 6, line 1, "($_f$, 14,300)," should read--($_e$, 14,300),--; claim 1, first formula,

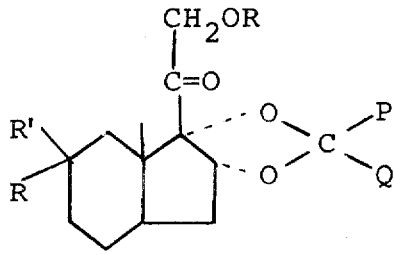   should read   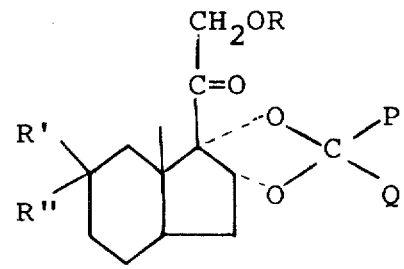

line 32, "acid" should read--acids--; line 33, "R," should read--R'--; second formula,

UNITED STATES PATENT OFFICE
CERTIFICATE OF CORRECTION

Patent No. 3,600,280  Dated August 17, 1971

Inventor(s) Patrick A. Diassi and Pacifico A. Principe

It is certified that error appears in the above-identified patent and that said Letters Patent are hereby corrected as shown below:

(2)

(Cont'd.)

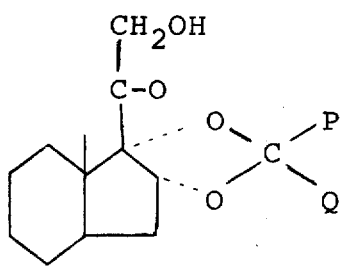   should read   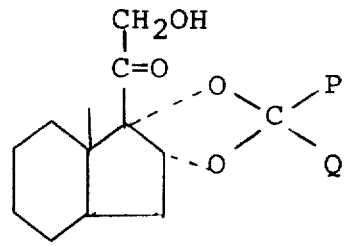

Signed and sealed this 21st day of March 1972.

(SEAL)
Attest:

EDWARD M. FLETCHER, JR.  ROBERT GOTTSCHALK
Attesting Officer  Commissioner of Patents